Feb. 10, 1925.
E. J. MILLS
1,525,617
DEVICE FOR FACILITATING OPERATION OF PUSH BRUSHES AND BROOMS
Filed April 16, 1923
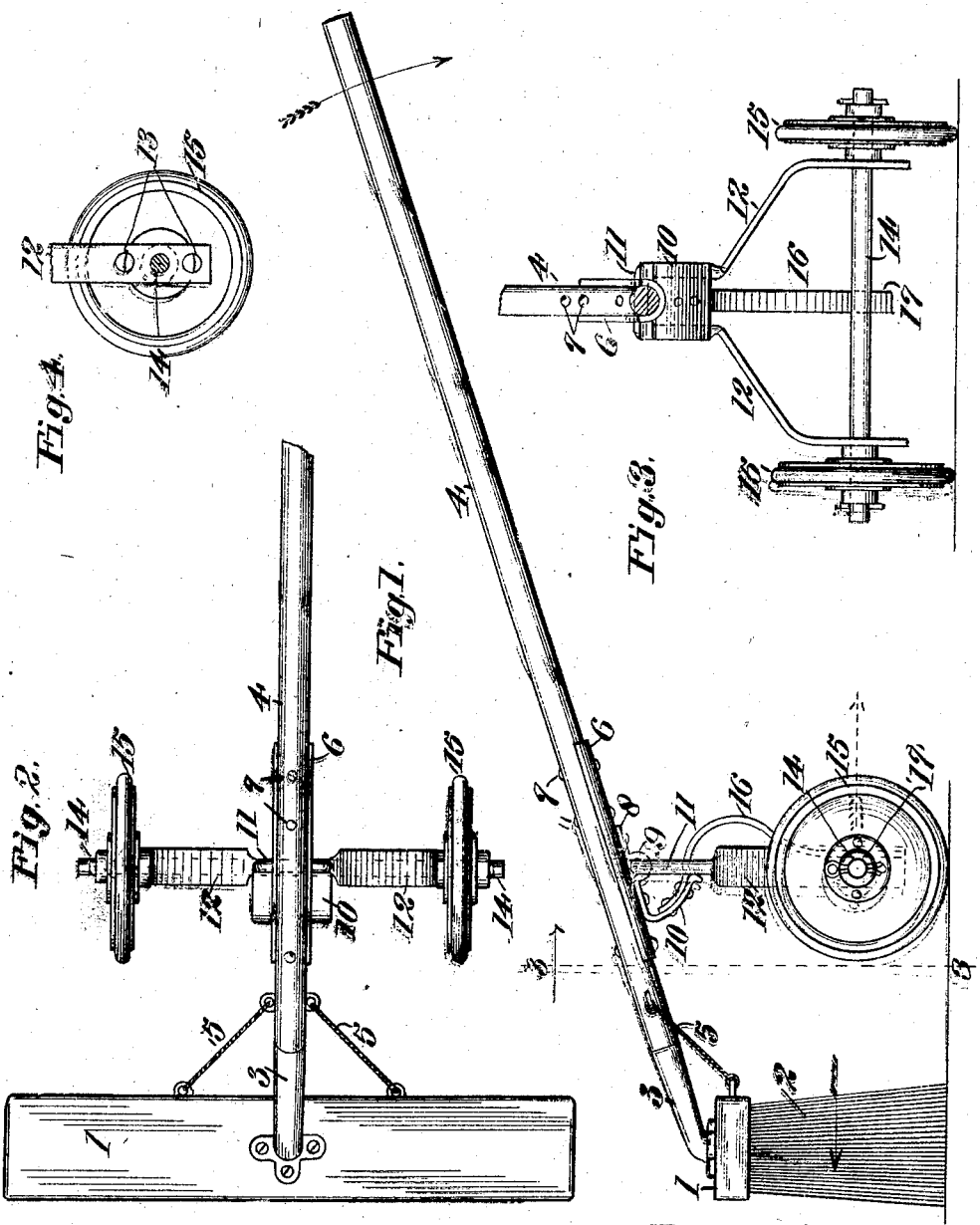
Inventor.
Edward J. Mills
By Cicero & Totten
Attorneys.

Patented Feb. 10, 1925.

1,525,617

UNITED STATES PATENT OFFICE.

EDWARD J. MILLS, OF GONZALES, CALIFORNIA.

DEVICE FOR FACILITATING OPERATION OF PUSH BRUSHES AND BROOMS.

Application filed April 16, 1923. Serial No. 632,505.

*To all whom it may concern:*

Be it known that I, EDWARD J. MILLS, a citizen of the United States, residing at Gonzales, in the county of Monterey and State of California, have invented certain new and useful Improvements in Devices for Facilitating Operation of Push Brushes and Brooms, of which the following is a specification.

The present invention relates to an apparatus designed to relieve the weight and rearward movement of that type of implement operated by what is commonly termed a push movement, such as street-sweeping hand brushes and shuffle hoes and push brooms and brushes generally.

The invention consists primarily in providing a carriage yieldably supported in rear of the implement and preferably provided with one or more ground running wheels, whereby the implement on a release of either forward or downward pressure on the operating handle, is raised from in contact with the operating surface and the weight thereof is supported by the carriage. The invention further consists in the novel form of carriage frame together with a particular type of carriage stop and pivotal mounting for securing the carriage to the implement handle and to the provision of a means for adjusting the distance between the ground and the fulcrum point connection of the frame with the handle to compensate for wear and difference in length of brush bristles.

With the abovementioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings disclosing one embodiment of my invention, Fig. 1 is a view in side elevation illustrating the carriage in vertical position and a brush as the implement carried by the handle.

Fig. 2 is a top plan view of the construction shown in Fig. 1.

Fig. 3 is a sectional view taken on the line 3—3 of Fig. 1 and Fig. 4 is a sectional view taken centrally through the axle.

In the drawings, 1 indicates the back of a conventional push brush mounting bristles or reeds 2 and angularly from the back extends a mounting bracket 3. The mounting bracket receives one end of a brush operating handle 4 of the well-known type and to insure a rigid connection between the brush and handle end, guys 5 may be provided. It will be understood that while I have illustrated a brush as the implement carried by the handle, any suitable type of push implement may be employed. A plate 6 is secured by rivets 7 to the under side of the handle 4 adjacent the end mounting the implement. Attached to the plate 6 is a strap 8 formed with an eye 9 and its end adjacent the implement being bent downwardly and rearwardly to form a stop 10 which terminates immediately below the eye 9. Fulcrumed in the eye 9 and extending therethrough is the yoke 11 of a substantially U-shaped frame 12 forming a carriage. The terminal ends of the frame are formed with aligned openings 13 which receive an axle 14 mounting supporting wheels 15 of any suitable type. The stop 10 mounts one end of a curved spring 16, the free end 17 of which is adapted to contact with the axle 14 and oppose the movement of the carriage from in contact with the stop 10. The axle 14 may be received in corresponding apertures 13 dependent on the length of reeds or bristles of the brush and this adjustment compensates for wear of these elements.

The implement, handle and carriage being assembled as in the drawings, the invention operates in the following manner. On the user imparting a brush stroke to the brush through the handle 4, which stroke is a forward and downward movement of the handle, the carriage 12 will swing on its pivot against the action of spring 16 and in a direction rearwardly from the implement, thus enabling the free operation of the implement but on the release of the pressure on the handle, the tension of spring 16 will immediately move the carriage 12 in a forward direction against stop 10 on the handle 4, supporting the weight of the implement and handle and enabling the operator to move the brush rearwardly for a next sweeping stroke without the operator being required to lift the load of the brush and handle which is increased by the length of the handle 4. On a successive forward brush stroke as above described, the carriage 12 yields and permits an effective operation of the brush. It will be observed that the carriage being mounted between the ends of the implement or brush and in rear thereof does not in any manner limit the use or effectiveness of the implement. It may be here stated that it is desirable to employ a spring 16 of a strength sufficient to compensate for the weight of the brush and maintain the carriage 12 in a vertical position when pressure is released from the handle 4.

Having thus described my invention, what I claim as new and desire to secure by Letters Patent, is:

1. In combination with a handle, an implement of the push type carried at one end thereof and adapted for operation on a forward and downward application of power to the handle, of a stop on said handle and a carriage mounted at its upper end to swing on a horizontal axis, and at its lower end carrying supporting wheels, and a spring bearing against the rear side of said carriage for swinging said carriage on its fulcrum against said stop for normally maintaining the implement raised from the ground on the release of forward and downward pressure on the handle.

2. In combination with a handle, an implement carried at one end thereof, a carriage depending from the handle in rear of the implement and including a frame fulcrumed to swing in a horizontal axis in an arcuate path to and from the implement, a pair of supporting wheels carried by the free end of the frame, a spring member tending to force the carriage toward the implement, and a stop for limiting the movement of the carriage by said spring.

3. In combination with an implement, an operating handle therefor extending at an inclination therefrom, a carriage comprising a substantially U-shaped frame, means for connecting the yoke of the frame to the handle to swing on a horizontal axis, an axle carried by the terminals of the frame, wheels carried by the axle, a stop for limiting the pivotal movement of the frame toward the implement and a spring for opposing the movement of the frame away from said stop.

4. In combination with a handle, an implement of the push type carried at one end thereof and adapted for operation on a forward and downward application of power to the handle, of a stop, and a carriage mounted to move to and from the implement and at its lower end carrying supporting wheels, and a spring acting on the carriage for moving the same against said stop for normally maintaining the implement raised from the ground on the release of forward and downward pressure on the handle.

In testimony whereof I have signed my name to this specification.

EDWARD J. MILLS.